USO12110070B2

(12) United States Patent
Rao et al.

(10) Patent No.: US 12,110,070 B2
(45) Date of Patent: Oct. 8, 2024

(54) FIFTH WHEEL RELEASE ARRANGEMENT (71) Applicant: Volvo Truck Corporation, Gothenburg (SE)

(72) Inventors: Nagendra Rao, Bangalore Karnataka (IN); Rohith Mn, Bangalore Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 521 days.

(21) Appl. No.: 17/626,300

(22) PCT Filed: Jul. 2, 2020

(86) PCT No.: PCT/EP2020/068676
§ 371 (c)(1),
(2) Date: Jan. 11, 2022

(87) PCT Pub. No.: WO2021/013495
PCT Pub. Date: Jan. 28, 2021

(65) Prior Publication Data
US 2022/0266926 A1   Aug. 25, 2022

(30) Foreign Application Priority Data

Jul. 24, 2019  (IN) .............................. 201941029954

(51) Int. Cl.
*B62D 53/08*      (2006.01)
(52) U.S. Cl.
CPC ..... *B62D 53/0807* (2013.01); *B62D 53/0871* (2013.01)
(58) Field of Classification Search
CPC .................. B62D 53/0807; B62D 53/0871
See application file for complete search history.

(56) References Cited

U.S. PATENT DOCUMENTS

| 4,269,426 A | 5/1981 | Bhushan |
| 6,145,864 A | 11/2000 | Sutherland |

(Continued)

FOREIGN PATENT DOCUMENTS

| CN | 102555706 A | 7/2012 |
| CN | 105228889 A | 1/2016 |

(Continued)

OTHER PUBLICATIONS

International Search Report and Written Opinion for International Patent Application No. PCT/EP2020/068676, mailed Oct. 30, 2020, 15 pages.

(Continued)

*Primary Examiner* — Kevin Hurley
(74) *Attorney, Agent, or Firm* — Withrow & Terranova, PLLC (57) ABSTRACT

A fifth wheel release arrangement for releasing a trailer from a towing vehicle in response to a trigger signal. The arrangement comprises one or more externally threaded fasteners and one or more pinion nuts comprising internal threads for engaging the external threads on the threaded fasteners, thereby holding the fifth wheel in position with respect to a first bracket attached to a towing vehicle frame, wherein the externally threaded fasteners are arranged to be rotationally fixed when received by the pinion nuts. The pinion nuts further comprise external teeth for engaging a toothed rack, and the rack is movable by an actuator system, in response to the trigger signal, in a direction to rotate the pinion nuts, whereby the externally threaded fasteners are ejected from the pinion nuts upon moving the rack by the actuator system in the direction, thereby releasing the trailer from the towing vehicle.

17 Claims, 5 Drawing Sheets

(56) References Cited

U.S. PATENT DOCUMENTS

| | | |
|---|---|---|
| 2007/0205578 A1 | 9/2007 | Cornish |
| 2008/0036173 A1 | 2/2008 | Alguera |

FOREIGN PATENT DOCUMENTS

| | | | |
|---|---|---|---|
| EP | 4286257 A1 * | 12/2023 | ............. B62D 53/10 |
| JP | H092340 A | 1/1997 | |
| JP | H092342 A | 1/1997 | |
| WO | 2015187083 A1 | 12/2015 | |

OTHER PUBLICATIONS

First Office Action for Chinese Patent Application No. 202080053548.6, mailed Jan. 6, 2024, 11 pages.

* cited by examiner

FIG. 10

FIFTH WHEEL RELEASE ARRANGEMENT

This application is a 35 USC 371 national phase filing of International Application No. PCT/EP2020/068676, filed Jul. 2, 2020, which in turn claims priority to Indian Patent Application No. 201941029954, filed Jul. 24, 2019, the disclosures of which are incorporated herein by reference in their entireties.

TECHNICAL FIELD

The present disclosure relates to arrangements for rapidly detaching a semi-trailer from a tractor vehicle in case of an emergency condition such as an imminent vehicle rollover event.

BACKGROUND

The fifth-wheel coupling provides a link between a semi-trailer and the towing truck, tractor unit, leading trailer or dolly. The coupling often consists of a vertical steel pin protruding from the bottom of the front of the semi-trailer, and a horseshoe-shaped coupling device called a fifth wheel arranged on the rear section of the towing vehicle. As the connected truck turns, the downward-facing surface of the semi-trailer (with the kingpin at the center) rotates against the upward-facing surface of the fixed fifth wheel, which does not rotate. To reduce friction, grease is often applied to the surface of the fifth wheel. The configuration is sometimes also called a turn-table.

It may sometimes be desirable to quickly detach the trailer from the towing vehicle, e.g., in case a rollover event is imminent, to protect the towing vehicle and its occupants.

WO 2015/187083 discloses an emergency release arrangement which is able to release the trailer from the towing vehicle in response to a trigger signal. However, the arrangement is not easily adapted for use with legacy equipment which legacy equipment requires substantial changes in order to be equipped with the emergency release system.

There is a need for improved release arrangements which can be added to existing fifth wheel coupling devices.

SUMMARY

It is an object of the present disclosure to provide improved fifth wheel release arrangements. This object is obtained by a fifth wheel release arrangement for releasing a trailer from a towing vehicle in response to a trigger signal. The arrangement comprises one or more externally threaded fasteners, one or more pinion nuts comprising internal threads for engaging the external threads on the threaded fasteners, thereby holding the fifth wheel in position with respect to a first bracket arranged attachable to a towing vehicle frame. The externally threaded fasteners are arranged to be rotationally fixed when received by the pinion nuts. The pinion nuts further comprise external teeth for engaging a toothed rack. This rack is movable by an actuator system, in response to the trigger signal, in a linear direction to rotate the pinion nuts, whereby the externally threaded fasteners are ejected from the pinion nuts upon moving the rack by the actuator system in the direction, thereby releasing the trailer from the towing vehicle.

This way a robust and efficient means for releasing the trailer from the towing vehicle is provided. The arrangement can be used together with existing fifth wheel platforms and towing vehicles, which is an advantage.

There is also disclosed herein a fifth wheel release arrangement for releasing a trailer from a towing vehicle in response to a trigger signal. The arrangement comprises one or more externally threaded fasteners, one or more nuts comprising internal threads for engaging the external threads on the threaded fasteners, thereby holding the fifth wheel in position with respect to a first bracket arranged attachable to a towing vehicle frame. Notably, the nuts are arranged to be fixed when having received the fasteners. The fasteners comprise external teeth arranged on a head portion of the fastener for engaging a toothed rack. The rack is movable by an actuator system, in response to the trigger signal, in a direction to rotate the fasteners, whereby the externally threaded fasteners are ejected from the nuts upon moving the rack by the actuator system in the direction, thereby releasing the trailer from the towing vehicle.

This way a robust and efficient means for releasing the trailer from the towing vehicle is provided. The arrangement can be used together with existing fifth wheel platforms and towing vehicles, which is an advantage.

According to some aspects, at least one of the externally threaded fasteners is arranged to be rotationally fixed by a bracket configured to rotationally fix a head portion of the externally threaded fasteners. This way the fasteners can be reliably and efficiently secured to prevent rotation and allow for ejection during fifth wheel release in response to the trigger signal.

According to some other aspects, at least one of the externally threaded fasteners is arranged to be rotationally fixed by a slot formed in the fastener in an extension direction of the threaded fastener, and a key insertable into the slot to prevent rotation of the threaded fastener. Again, this way the fasteners can be reliably and efficiently secured to prevent rotation and allow for ejection during fifth wheel release in response to the trigger signal.

According to aspects, at least one of the pinion nuts bears against the first bracket on one side of the pinion nut and bears against a second bracket on the opposite side of the pinion nut. These bearings provide stability to the pinion nut, even when no threaded fastener is received by the nut, which simplifies mounting the fifth wheel platform. The bearings allow rotation of the pinion nuts upon actuation of the rack. The bearings provide reduced friction and therefore simplifies fifth wheel release in response to the trigger signal.

According to aspects, the actuator system comprises a cylinder configured to extend in response to the trigger signal, thereby moving the rack via a link member. The cylinder may comprise any of; a pneumatic system, a hydraulic system, or a pyrotechnical charge configured to extend the cylinder in response to the trigger signal. Thus, reliable and relatively low cost actuator systems can be used together with the proposed fifth wheel release arrangement, which is an advantage.

According to aspects, the cylinder is configured to extend by a Sodium Azide charge configured to be activated by the triggered signal. The Sodium Azide charge in combination with the cylinder provides a powerful but stable actuation means for rapidly providing strong linear forces.

According to aspects, the rack is configured to be moved by an electric motor in response to the trigger signal. The electric motor offers the possibility to release the fifth wheel several times without need to replace, e.g., a pyrotechnical charge or the like.

According to aspects, the fifth wheel release arrangement comprises a casing arranged to shield the one or more externally threaded fasteners and the one or more pinion nuts from mechanical impact, corrosion, and/or particle build-up. This casing prolongs life-time of the release arrangement and prevents problems related to mechanical impact, corrosion, and/or particle build-up.

According to aspects, the fifth wheel release arrangement comprises a control unit arranged to detect a rollover condition and to issue the trigger signal in response to detecting the rollover condition. Thus, a control system is provided able to correctly issue the trigger signal when needed to prevent, e.g., a rollover event.

According to aspects, the control unit comprises a tilt angle sensor arranged to detect a tilt angle of the trailer, wherein the control unit is arranged to issue the trigger signal when the tilt angle of the trailer exceeds a threshold value. The threshold value may be configured in dependence of an estimated center of gravity location associated with the trailer, and/or in dependence of an estimated lateral acceleration associated with the trailer. This way a more refined trigger system is provided able to adapt to current vehicle combination properties, thereby providing a more reliable rollover prevention system.

There are also disclosed herein vehicles associated with the above-mentioned advantages. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
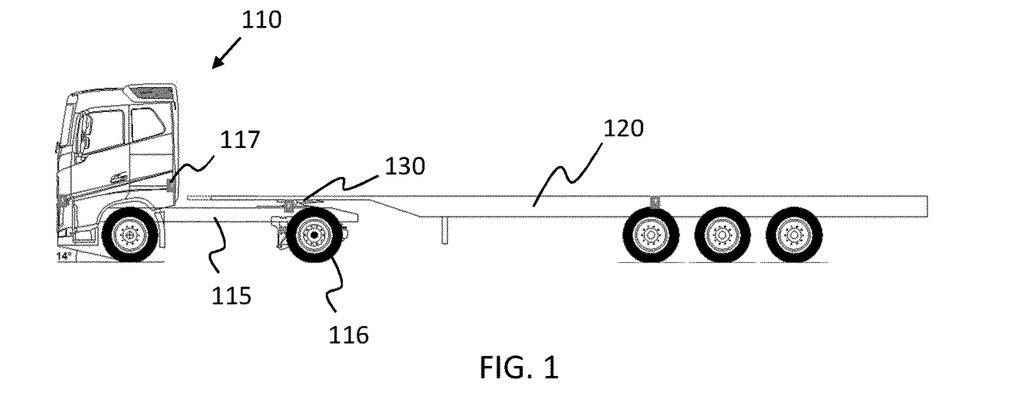
FIG. 1 illustrates a vehicle.

FIG. 1 schematically illustrates a vehicle combination 100. The vehicle combination 100 comprises a towing vehicle 110 and a trailer 120. The towing vehicle 110 is built around a vehicle frame 115. The towing vehicle 110 comprises a fifth wheel coupling arrangement 130 for towing the trailer 120. The fifth wheel 130 is generally arranged in vicinity of the rear wheels 116 of the towing vehicle.

Figure 2:
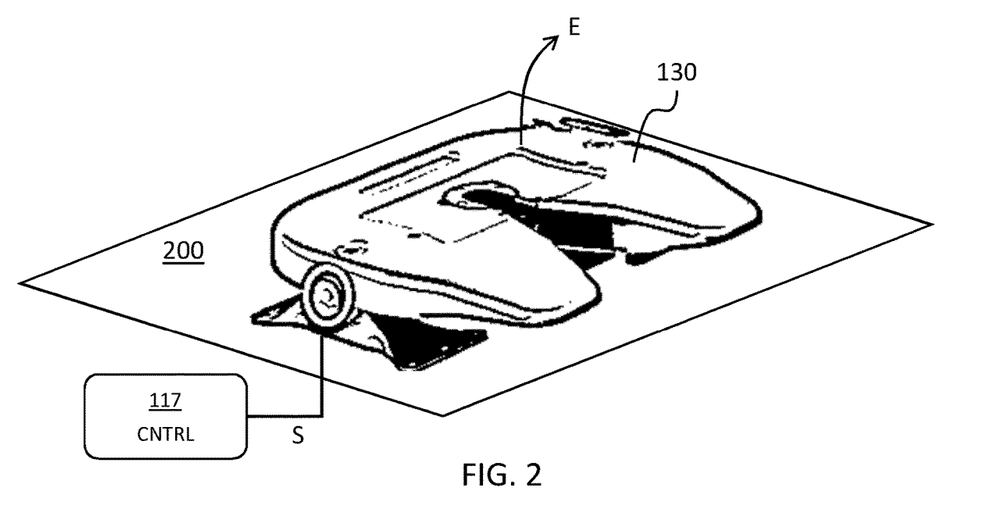
FIG. 2 shows an example fifth wheel coupling device.

FIG. 2 shows an example fifth wheel 130 attached to a fifth wheel platform 200. The platform 200 is then attached to the towing vehicle frame 115 using, e.g., bolts and brackets.

A rollover is a type of vehicle accident in which a vehicle, such as the vehicle combination 100, tips over onto its side or roof. Rollovers have a higher fatality rate than other types of vehicle collisions, and it is highly desirable to avoid rollover of at least the towing vehicle 110. Rollover events may be the result of steering input, speed, and friction with the ground.

Rollovers occur when cornering forces destabilize the vehicle. As a vehicle rounds a corner, three forces act on it: tire forces (the centripetal force), inertial effects (the centrifugal force), and gravity. The cornering forces from the tire push the vehicle towards the center of the curve. This force acts at ground level, below the center of mass. The force of inertia acts horizontally through the vehicle's center of mass away from the center of the turn. These two forces make the vehicle roll towards the outside of the curve. The force of the vehicle's weight acts downward through the center of mass in the opposite direction. When the tire and inertial forces are enough to overcome the force of gravity, the vehicle starts to turn over.

The present disclosure aims to alleviate consequences of rollover by disconnecting the towing vehicle 110 from the trailer 120 when rollover is imminent. When the vehicle combination 100 becomes unstable and starts to roll over, a trigger signal is generated which detaches the trailer from the towing vehicle. This cause a change in the dynamic properties of the vehicle, which means that the towing vehicle can right itself, while the trailer may continue to roll over. An angle relative to ground where the towing vehicle may be disconnected is on the order of 40 degrees or so.

With reference to FIG. 2, the fifth wheel 130 described herein is arranged to be detached E from the towing vehicle frame 115 by a fifth wheel release arrangement in response to a trigger signal S generated by a control unit 117. The control unit 117 will be discussed in more detail below in connection to FIG. 10.

Figure 3:
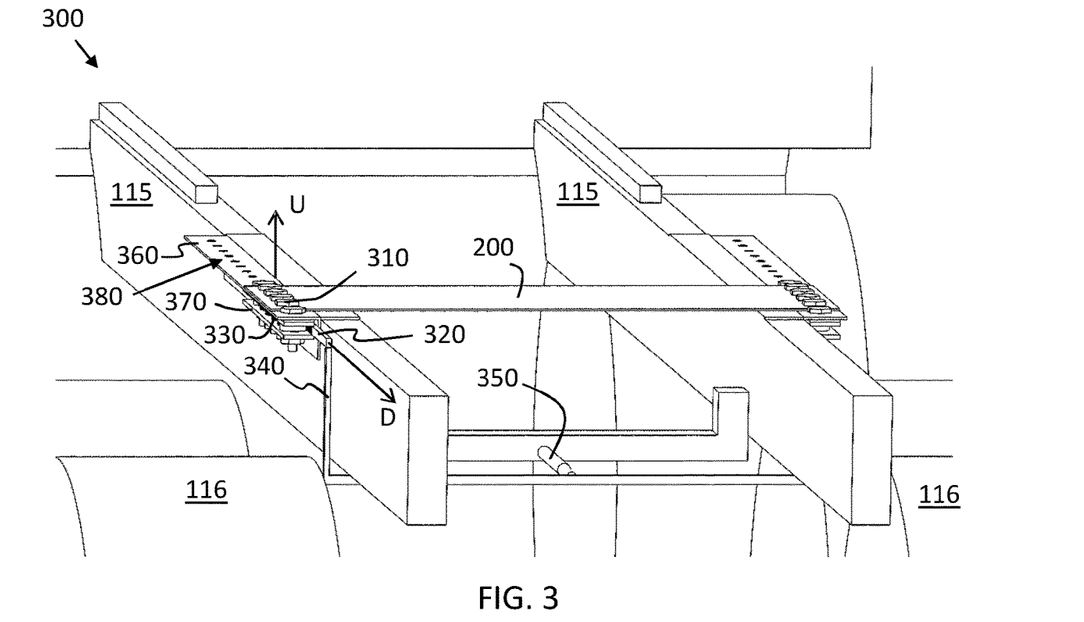
FIGS. 3-6 schematically illustrate an example fifth wheel detachment arrangement.

FIG. 3 shows a schematic view of the rear section of the towing vehicle 120. The rear wheels 116 are seen, as well as a section of the towing vehicle frame 115. The fifth wheel platform 200 is attached to a first bracket 360, which in turn is attached to the vehicle frame 115. FIG. 3 shows a fifth wheel 130 release arrangement 300 for releasing a trailer 120 from a towing vehicle 110 in response to a trigger signal. The arrangement 300 comprises one or more externally threaded fasteners 310, such as threaded bolts arranged to secure the fifth wheel 130 to the first bracket 360.

One or more pinion nuts 330 comprise internal threads 810 for engaging the external threads on the threaded fasteners 310. The threaded fasteners 310 and the pinion nuts 330 together secure the fifth wheel platform 200 to the first bracket 360 in the traditional way, i.e., holding the fifth wheel in position with respect to the first bracket 360 attached to the towing vehicle frame 115.

However, the differently from known fifth wheel mounting arrangements, the externally threaded fasteners 310 are arranged to be rotationally fixed when received by the pinion nuts 330. This means that the threaded fasteners 310 are prevented from rotating about a rotational symmetry axis 760 of the threaded fastener, see FIG. 7. However, the threaded fasteners are not preventing from moving in a longitudinal direction, along an extension direction of the threaded fastener 310, by anything more than the retaining force exerted by the pinion nut.

The pinion nuts 330 comprise external teeth 820 for engaging a toothed rack 320. These teeth are shown in FIG. 8, which illustrates an example pinion nut 330 in more detail. The pinion nut 330 comprises a central hole configured with internal threads 810, just like a normal nut. The pinion nut also comprises angled smooth surfaces 830 on opposite ends of the pinion nut. These surfaces 830 are arranged for bearing against a corresponding surface of first and second brackets which will be discussed below in connection to FIG. 7.

The rack 320 is movable in a direction D by an actuator system 340, 350, in response to the trigger signal. Moving the rack 320 in direction D causes the pinion nuts 330 to rotate in a manner similar to a traditional rack and pinion arrangement. Since the threaded fasteners are rotationally fixed, they will be forced upwards, in direction U, and away from the mounting plate 200 by the rotation of the pinion nuts 330. Thus, the externally threaded fasteners 310 are ejected from the pinion nuts in direction U upon moving the rack by the actuator system in the direction D, thereby releasing the trailer 120 from the towing vehicle 110.

The actuator system 340, 350 shown in FIG. 3 comprises a cylinder 350 configured to extend in response to the trigger signal S. This extension by the cylinder 350 is transferred by a link member 340 into a linear motion by the rack in the direction D to eject the threaded fasteners in direction U.

FIG. 3 shows one row of threaded fasteners and corresponding pinion nuts arranged on a left side of the towing vehicle, and another row of threaded fasteners and corresponding pinion nuts arranged on the right side of the towing vehicle, i.e., on two opposite sides of the fifth wheel platform 200.

It is noted that the first bracket 360 comprises additional holes 380 where no bolt or fastener is present. The extra holes are for moving the fifth wheel platform 200 in relation to the towing vehicle depending on, e.g., trailer load. Consequently, the arrangements disclosed herein are suitable for use with so-called slidable fifth wheel arrangements.

Figure 4:
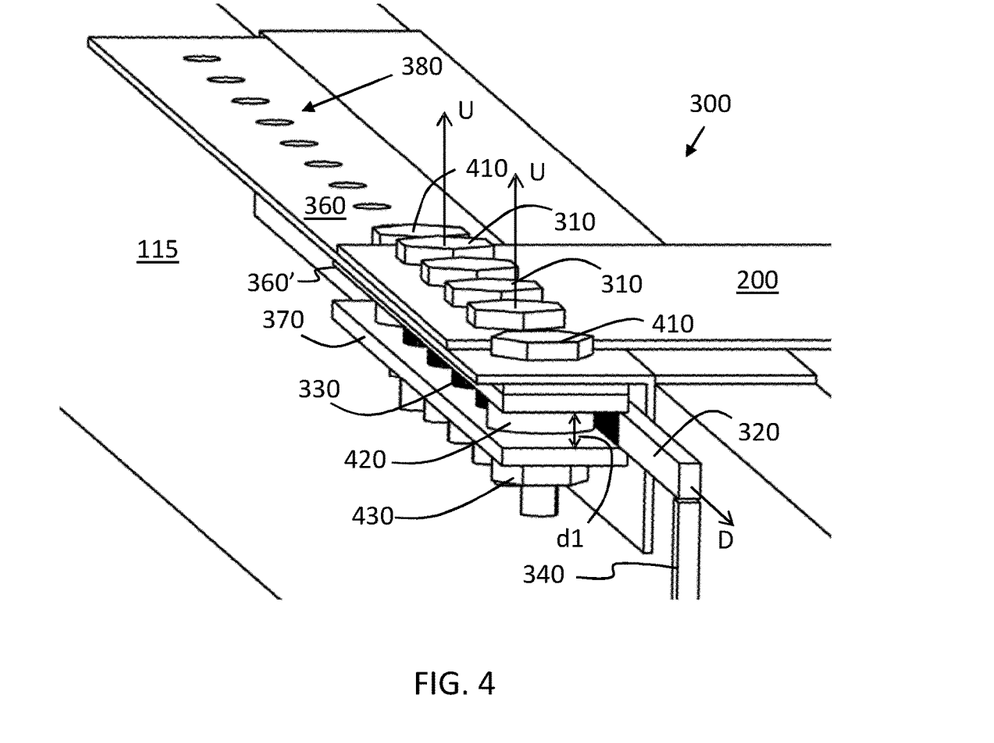

FIG. 4 shows the release arrangement 300 in more detail. The fifth wheel platform 200 rests on the first bracket 360 and is held in place by the threaded fasteners which engage with the pinion nuts 330. Additional fasteners 410 are arranged on either side of the fifth wheel platform 200 to secure a second bracket 370 to the first bracket 360', displaced from the first bracket a distance d1 by a spacer 420. The pinion nuts 330 are arranged to be held in position with respect to the first 360 and second 370 bracket. This means that the pinion nuts can rotate about a center axis of rotation when the rack is moved, but the pinion nuts are otherwise fixed.

Figure 5:
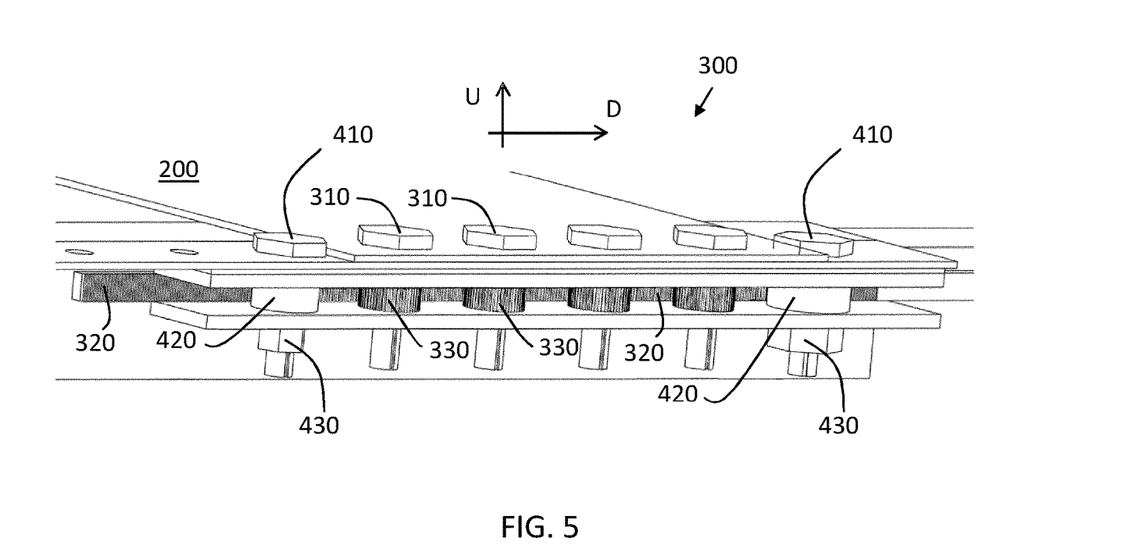

FIG. 5 shows an additional view of the release arrangement 300. The toothed rack 320 is here shown engaging the external teeth of the pinion nuts. When the rack is moved, the pinion nuts rotate. In case the threaded fasteners 310 are rotationally fixed, the movement by the rack to the right in FIG. 5, i.e., in the direction D, will cause the threaded fasteners to move linearly in a direction upwards U orthogonal to the movement direction of the rack. It is appreciated that the direction of movement of the threaded fasteners depends on the thread configuration of the fasteners 310. This thread needs to be configured correctly in order for the fasteners 310 to move upwards U when the rack is moved in response to the trigger signal, and not the other way.

Figure 6:
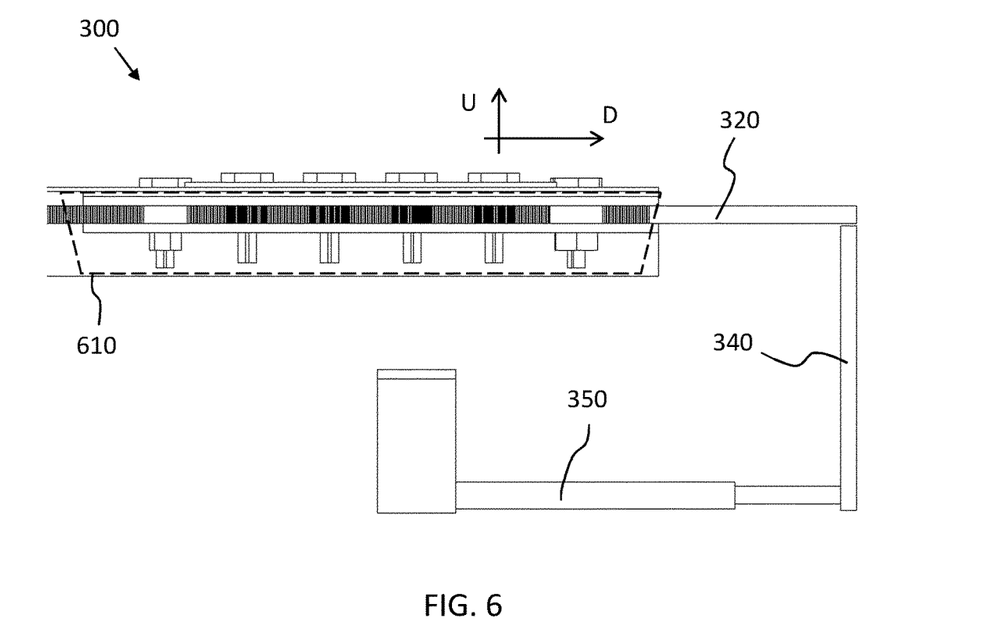

FIG. 6 shows yet another view of the fastening arrangement 300. According to some aspects, the actuator system comprises a cylinder 350 configured to extend in response to the trigger signal, thereby moving the rack 320 via a link member 340.

It is appreciated that a number of different mechanical arrangements can be used in order to bring about the linear motion of the rack. The current concept is not limited to the actuator system 340, 350 illustrated in FIG. 6.

According to some aspects, the cylinder 350 comprises a pyrotechnical charge configured to extend the cylinder in response to the trigger signal.

According to some aspects, the cylinder 350 is configured to extend by a Sodium Azide charge configured to be activated by the triggered signal.

The portions of external threads extending past the pinion nuts may be sensitive to mechanical impacts and build-up of dirt and corrosion. In order to protect the release arrangement, an optional casing 610 shown in FIG. 6 can be arranged to shield the one or more externally threaded fasteners 310 and the one or more pinion nuts 330 from mechanical impact, corrosion, and/or particle build-up.

Figure 7:
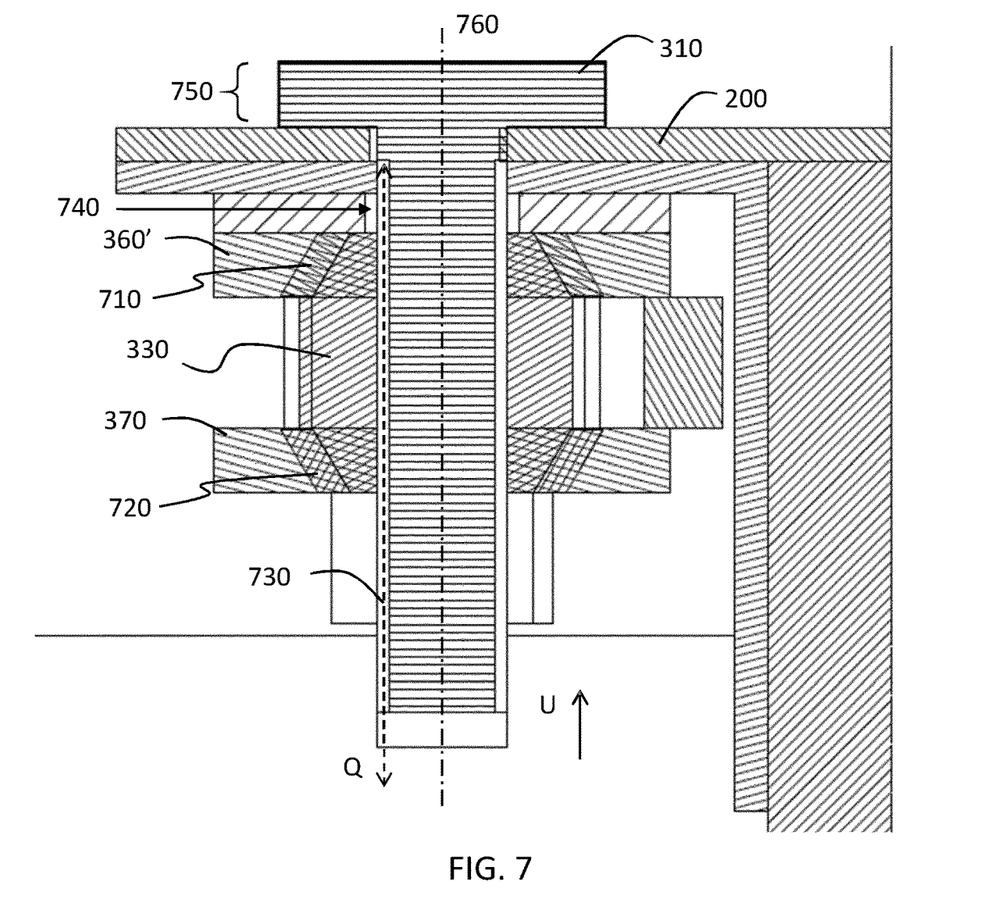
FIG. 7 shows details of an example fifth wheel detachment arrangement.
Figure 8:
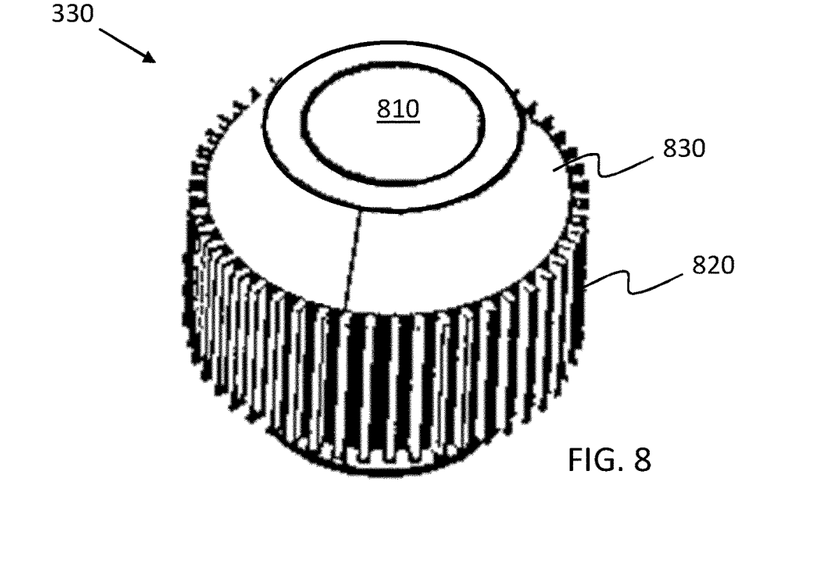
FIG. 8 schematically illustrates a pinion nut.
Figure 9:
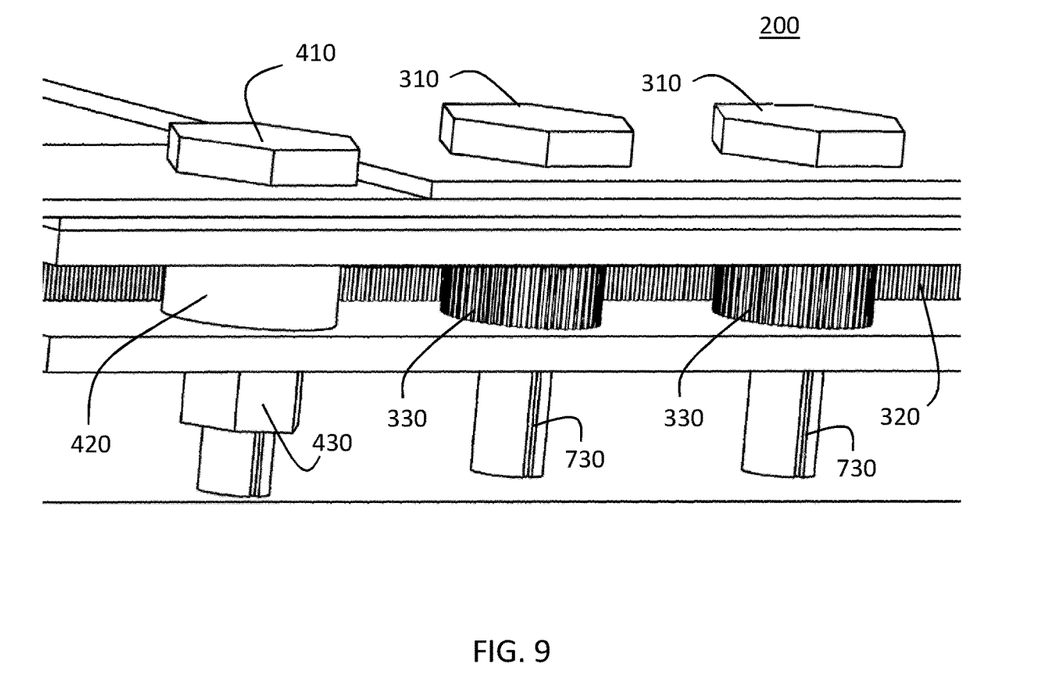
FIG. 9 shows details of an example fifth wheel detachment arrangement.

FIG. 7 illustrates a cross-sectional view of an example threaded fastener 310 which is engaging a pinion nut 330 to secure the fifth wheel platform 200 to the towing vehicle. The pinion nut 330 bears 710 against the first bracket 360' on one side and bears 720 against the second bracket 370 on the other side of the pinion nut. The bearings may, e.g., be thrust bearings. The bearings allow the pinion nut to rotate about a center axis of rotation 760, but otherwise stably holds the pinion nut in position. In other words, according to aspects, at least one of the pinion nuts 330 bears 710 against the first bracket on one side of the pinion nut and bears 720 against a second bracket 370 on the opposite side of the pinion nut. Optionally, the pinion nut bearing arrangement comprises one or more thrust bearings.

Note that the rack prevents the pinion nut from rotating, such that the threaded fastener may be screwed into the pinion nut 330, just like a traditional bolt and nut fastening arrangement for a legacy fifth wheel platform attachment system.

As noted above, the threaded fastener 310 is arranged to be rotationally fixed once received by the pinion nut, i.e., locked in place. This rotational fixing can be achieved in a number of different ways. For instance, a head portion 750 of the threaded fastener can be held by a bracket or the like. Thus, optionally, at least one of the externally threaded fasteners 310 is arranged to be rotationally fixed by a bracket configured to rotationally fix a head portion 750 of the externally threaded fastener 310.

According to another example, at least one of the externally threaded fasteners 310 is arranged to be rotationally fixed by a slot 730 formed in the fastener in an extension direction Q of the threaded fastener, and a key insertable into the slot 730 to prevent rotation of the threaded fastener 310. The key can slide in the slot 730, thereby allowing linear motion by the threaded fastener 310 in the upwards direction U, however, as long as the key remains inserted in the slot 730, the threaded fastener is rotationally fixed. This means that a threaded fastener can be screwed into a pinion nut, and, once secured, the threaded fastener can be locked to prevent further rotation by the threaded fastener.

Figure 10:
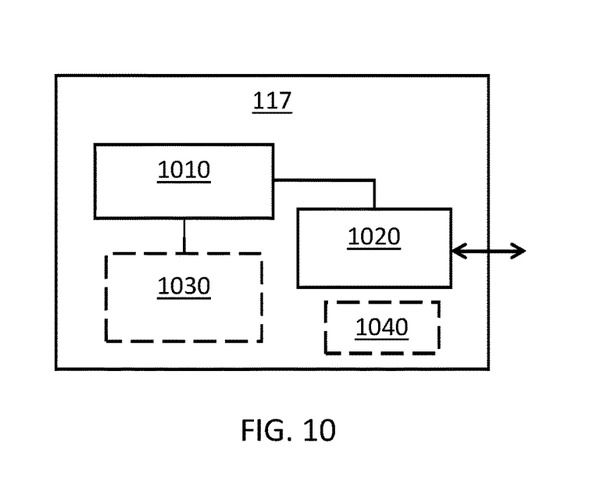
FIG. 10 schematically illustrates a control unit.

FIG. 10 illustrates a control unit 117 arranged to detect a rollover condition and to issue the trigger signal in response to detecting the rollover condition. The control unit 117 may, e.g., comprise a tilt angle sensor 1040 arranged to detect a tilt angle of the trailer 120. The control unit 117 is then arranged to issue the trigger signal when the tilt angle of the trailer 120 exceeds a threshold value.

According to some aspects, the threshold value is configured in dependence of an estimated center of gravity location associated with the trailer 120. For instance, the trailer may be laded unevenly, which means that different tilt angles can be safely allowed for tilting to the left and tilting to the right.

According to some other aspects, the threshold value is configured in dependence of an estimated lateral acceleration associated with the trailer 120. It may be advisable to use larger safety margins when the vehicle combination 100 is subject to large lateral forces resulting from, e.g., high speeds.

As an alternative to letting the pinion nuts rotate by means of the rack, the threaded fasteners can be rotated in the same way by threads cut in head portions of the fasteners. In other words, there is also disclosed herein a fifth wheel 130 release arrangement 300 for releasing a trailer 120 from a towing vehicle 110 in response to a trigger signal. The arrangement 300 comprises one or more externally threaded fasteners 310, one or more nuts comprising internal threads for engaging the external threads on the threaded fasteners, thereby holding the fifth wheel in position with respect to a first bracket 360 arranged attachable to a towing vehicle frame 115. The nuts are arranged to be fixed when having received the fasteners 310, the fasteners 310 comprise external teeth arranged on a head portion 750 of the fastener for engaging a toothed rack 320. The rack 320 is movable by an actuator system 340, 350, in response to the trigger signal, in a direction to rotate the fasteners, whereby the externally threaded fasteners 310 are ejected from the nuts upon moving the rack by the actuator system in the direction, thereby releasing the trailer 120 from the towing vehicle 110.

FIG. 10 schematically illustrates, in terms of a number of functional units, the components of a control unit 117 according to embodiments of the discussions herein. This control unit 117 may be comprised in the vehicle 1. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the control unit 117 to perform a set of operations, or steps, such as the methods discussed herein. For example, the storage medium 1030 may store the set of operations, and the processing circuitry 1010 may be configured to retrieve the set of operations from the storage medium 1030 to cause the control unit 117 to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The control unit 117 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 101, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

The invention claimed is:

1. A fifth wheel release arrangement for releasing a trailer from a towing vehicle in response to a trigger signal, the arrangement comprising:
   one or more externally threaded fasteners, and
   one or more pinion nuts comprising internal threads for engaging the external threads on the threaded fasteners, thereby holding the fifth wheel in position with respect to a first bracket arranged attachable to a towing vehicle frame, wherein the externally threaded fasteners are arranged to be rotationally fixed when received by the pinion nuts,
   wherein the pinion nuts comprise external teeth for engaging a toothed rack, the rack being movable by an actuator system, in response to the trigger signal, in a direction to rotate the pinion nuts, whereby the externally threaded fasteners are ejected from the pinion nuts upon moving the rack by the actuator system, thereby releasing the trailer from the towing vehicle.

2. The fifth wheel release arrangement of claim 1, wherein the externally threaded fasteners are threaded bolts arranged to secure the fifth wheel to the first bracket.

3. The fifth wheel release arrangement of claim 1, wherein at least one of the externally threaded fasteners is arranged to be rotationally fixed by a bracket configured to rotationally fix a head portion of the externally threaded fastener.

4. The fifth wheel release arrangement of claim 1, wherein at least one of the externally threaded fasteners is arranged to be rotationally fixed by a slot formed in the fastener in an extension direction of the threaded fastener, and a key insertable into the slot to prevent rotation of the threaded fastener.

5. The fifth wheel release arrangement of claim 1, wherein at least one of the pinion nuts bears against the first bracket on one side of the pinion nut, and bears against a second bracket on the opposite side of the pinion nut.

6. The fifth wheel release arrangement of claim 5, wherein the pinion nut bearing arrangement comprises one or more thrust bearings.

7. The fifth wheel release arrangement of claim 1, wherein the actuator system comprises a cylinder configured to extend in response to the trigger signal, thereby moving the rack via a link member.

8. The fifth wheel release arrangement of claim 7, wherein the cylinder comprises any of:
   a pneumatic system,
   a hydraulic system, or
   a pyrotechnical charge configured to extend the cylinder in response to the trigger signal.

9. The fifth wheel release arrangement of claim 7, wherein the cylinder is configured to extend by a Sodium Azide charge configured to be activated by the triggered signal.

10. The fifth wheel release arrangement of claim 1, wherein the rack is configured to be moved by an electric motor in response to the trigger signal.

11. The fifth wheel release arrangement of claim 1, comprising a casing arranged to shield the one or more externally threaded fasteners and the one or more pinion nuts from mechanical impact, corrosion, and/or particle build-up.

12. The fifth wheel release arrangement of claim 1, comprising a control unit arranged to detect a rollover condition and to issue the trigger signal in response to detecting the rollover condition.

13. The fifth wheel release arrangement of claim 12, wherein the control unit comprises:
   a tilt angle sensor arranged to detect a tilt angle of the trailer,
   wherein the control unit is arranged to issue the trigger signal when the tilt angle of the trailer exceeds a threshold value.

14. The fifth wheel release arrangement of claim 13, wherein the threshold value is based on an estimated center of gravity location associated with the trailer.

15. The fifth wheel release arrangement of claim 13, wherein the threshold value is based on an estimated lateral acceleration associated with the trailer.

16. A fifth wheel release arrangement for releasing a trailer from a towing vehicle in response to a trigger signal, the arrangement comprising:
   one or more externally threaded fasteners, and
   one or more nuts comprising internal threads for engaging the external threads on the threaded fasteners, thereby holding the fifth wheel in position with respect to a first bracket arranged attachable to a towing vehicle frame,
   wherein the nuts are arranged to be fixed when having received the fasteners,
   wherein the fasteners comprise external teeth arranged on a head portion of the fastener for engaging a toothed rack, and
   wherein the rack is movable by an actuator system, in response to the trigger signal, in a direction to rotate the fasteners, whereby the externally threaded fasteners are ejected from the nuts upon moving the rack by the actuator system, thereby releasing the trailer from the towing vehicle.

17. A vehicle combination or towing vehicle comprising:
   a fifth wheel release arrangement for releasing a trailer from a towing vehicle in response to a trigger signal, the arrangement comprising:
   one or more externally threaded fasteners, and
   one or more pinion nuts comprising internal threads for engaging the external threads on the threaded fasteners, thereby holding the fifth wheel in position with respect to a first bracket arranged attachable to a towing vehicle frame, wherein the externally threaded fasteners are arranged to be rotationally fixed when received by the pinion nuts,
   wherein the pinion nuts comprise external teeth for engaging a toothed rack, the rack being movable by an actuator system, in response to the trigger signal, in a direction to rotate the pinion nuts, whereby the externally threaded fasteners are ejected from the pinion nuts upon moving the rack by the actuator system, thereby releasing the trailer from the towing vehicle.

\* \* \* \* \*